United States Patent [19]

Yamamoto

[11] Patent Number: 4,584,721
[45] Date of Patent: Apr. 29, 1986

[54] DEVICE FOR USE IN HELMET FOR PREVENTING FOGGING BY ELECTRIC HEATING

[75] Inventor: Tamenobu Yamamoto, Higashi-Osaka, Japan

[73] Assignee: Yamamoto Kogaku Co., Ltd., Japan

[21] Appl. No.: 476,156

[22] Filed: Mar. 17, 1983

[30] Foreign Application Priority Data

May 12, 1982 [JP] Japan .............................. 57-70187[U]

[51] Int. Cl.⁴ .............................................. A42B 3/02
[52] U.S. Cl. .......................................... 2/424; 2/435; 2/434; 219/203
[58] Field of Search ................... 2/424, 435, 10, 434; 219/203, 211, 543

[56] References Cited

U.S. PATENT DOCUMENTS

| 2,979,596 | 4/1961 | Karp | 219/203 X |
| 3,024,341 | 3/1962 | Ogle, Jr. et al. | 219/203 X |
| 3,027,561 | 4/1962 | Senne | 2/435 |
| 3,495,259 | 2/1970 | Rocholl et al. | |
| 3,892,947 | 7/1975 | Strengholt | 219/203 X |
| 4,047,249 | 9/1977 | Booth | 2/434 X |

FOREIGN PATENT DOCUMENTS

| 10-5304 | 4/1935 | Japan . | |
| 0636251 | 5/1983 | Switzerland | 2/435 |

Primary Examiner—Peter Nerbun
Attorney, Agent, or Firm—Armstrong, Nikaido, Marmelstein & Kubovcik

[57] ABSTRACT

A device for use in a helmet having a shield panel for preventing the shield panel from fogging by electric heating. A transparent electroconductive film is provided inside the shield panel for passing current through the film to generate heat. An assembly including the conductive film is removable from the shield panel for repeated use when the shield panel is to be replaced by a new one due to damage.

4 Claims, 25 Drawing Figures

DEVICE FOR USE IN HELMET FOR PREVENTING FOGGING BY ELECTRIC HEATING

BACKGROUND OF THE INVENTION

The present invention relates to a device for use in helmets for preventing fogging by electric heating.

When helmets of the full-face type for motorcycle or snowmobile riders are used in a cold climate, the shield panel covering the front opening of the helmet is likely to fog up due to the condensation of water vapor on the inner surface of the panel, or the droplets of water formed by condensation will freeze, consequently obstructing the field of view and rendering the helmet unusable. Stated more specifically, with the helmet which is used on a motorcycle or like vehicle running at a high speed, the shield panel is exceedingly cooled with air during running, so that when the interior of the helmet becomes no longer ventilated on stopping, the heat released from the face of the rider raises the temperature of the interior to produce a difference in temperature between the inside and outside of the helmet, fogging up the inner surface of the shield panel due to the condensation of water vapor and permitting the droplets of water to freeze immediately. Accordingly a device has been provided which comprises a resistance wire attached to the inner surface of the shield panel for maintaining the panel in a heated state by passing current through the wire to prevent freezing. However, the device, which is adapted to heat the shield panel locally, is unable to achieve a sufficient effect to prevent freezing.

SUMMARY OF THE INVENTION

A first object of the present invention is to provide a fogging preventing device of the electric heating type for use in a helmet having a shield panel, the device comprising a heat generating electroconductive film formed on the inner surface of the shield panel so that even when the interior of the helmet becomes no longer ventilated upon stopping during running, the inner surface of the shield panel is prevented from fogging due to the condensation of water vapor, the device further reliably preventing freezing of water droplets on condensation.

A second object of the invention is to provide a device of the type described wherein even when the electroconductive film is formed over the entire area required for assuring good visibility, the film will not obstruct the view to ensure sufficient visibility.

A third object of the invention is to provide a device of the type described wherein an assembly including the electroconductive film is removable from the shield panel for repeated use when the shield panel is to be replaced by a new one due to damage.

A fourth object of the invention is to provide a device of the type described wherein the temperature of the heat generated by the electroconductive film is detectable to control the current therethrough so that the shield panel can be maintained at an optimum temperature at all times.

Other objects, features and benefits of the present invention will become more apparent from the following description with reference to the accompanying drawings.

BRIEF DESCRIPTION OF THE DRAWINGS

FIGS. 1 to 9 show a first embodiment of the invention;
FIGS. 10 to 20 show a second embodiment of the invention;
FIGS. 21 to 25 show modifications of the invention;
FIGS. 25 (A), (B) and (C) are diagrams showing different modes of connecting lead wires to electrodes.

DESCRIPTION OF THE PREFERRED EMBODIMENTS

Figures 1, 5:
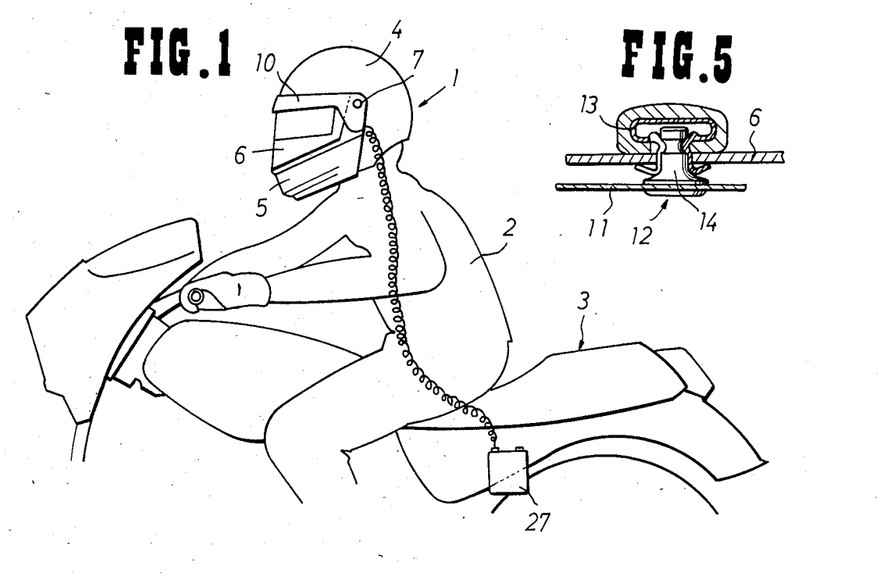
FIG. 1 is a side elevation showing the same during use.
FIG. 5 is a sectional view showing a snap fastener.
Figure 2:
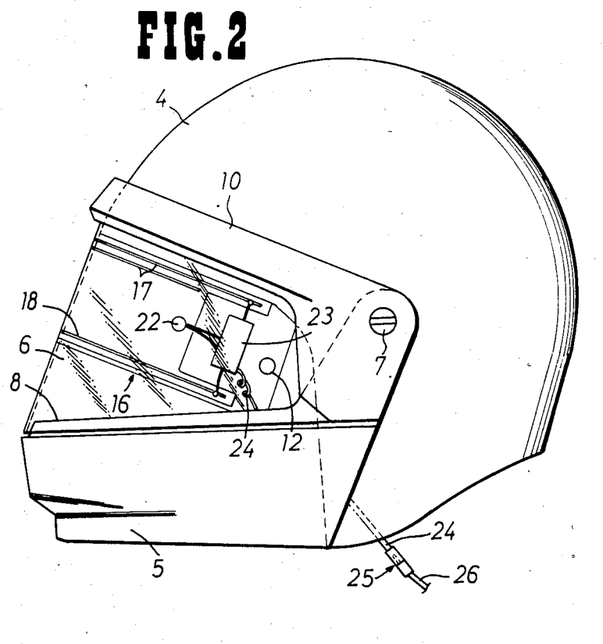
FIG. 2 is a side elevation showing a helmet.
Figure 3:
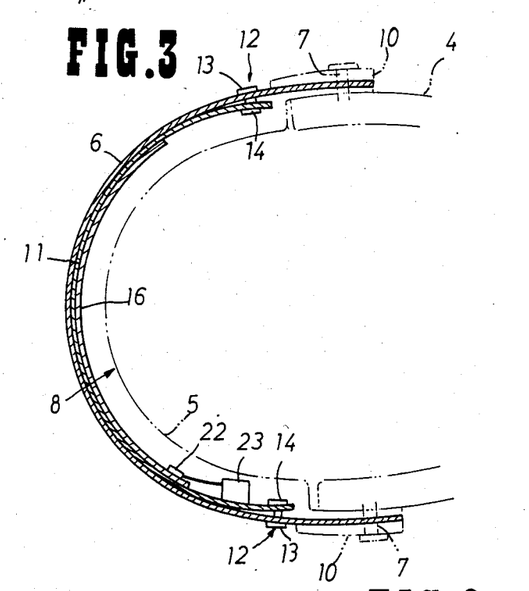
FIG. 3 is a cross sectional view showing a shield panel.
Figure 4:
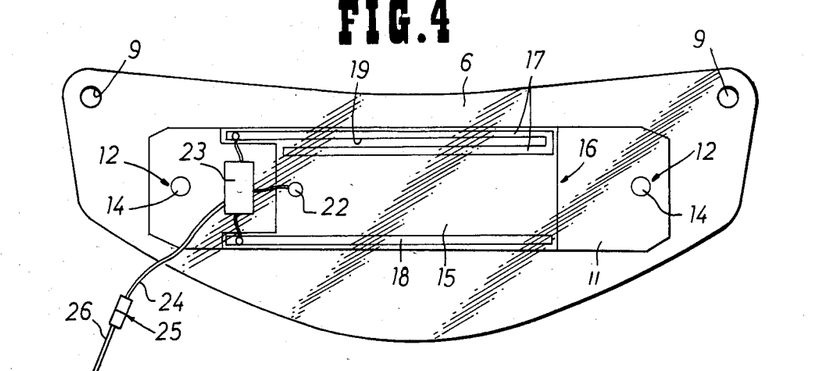
FIG. 4 is a rear view in development showing the shield panel.
Figure 6:
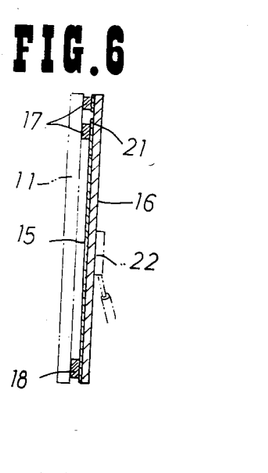
FIG. 6 is a sectional view showing a heat generating plate.

FIG. 1 shows a rider 2 wearing a helmet 1 and riding a motorcycle 3, with an embodiment of the invention attached to the helmet 1. The helmet 1 comprises a helmet main body 4, a guard 5 and a shield panel 6. As seen in FIGS. 2 and 3, the guard 5 is pivoted to the main body 4 by a pair of opposite mount screws 7 and is movable upward or downward. When the guard 5 is lowered to a predetermined protecting position, a front opening 8 for assuring a field of view is defined by a front cut edge of the main body 4 and the guard 5. The shield panel 6, which is adapted to close the front opening 8, is pivoted to the main body 4 by the pair of mount screws 7 and is upwardly openable and downwardly closable. As shown in FIG. 4, the shield panel 6 is in the form of a planar transparent plate and is formed with holes 9 for the mount screws 7 at its opposite ends. The panel is removably attached to the main body 4 as bent arcuately. The upper edge of the shield panel is detachably supported by a shield frame 10. Accordingly the shield panel 6 is replaceable when damaged. A support plate 11 in the form of a transparent strip is removably attached to the inner surface of the shield panel 6 by snap fasteners 12 which are positioned at the level of the eyes of the rider 2 and provided at opposite ends of the plate so as not to obstruct the view. As seen in FIG. 5, the snap fastener 12 comprises a socket member 13 and a stud member 14. The socket member 13 is mounted on the shield panel 6, and the stud member 14 on the support plate 11. With reference to FIG. 6, a heat generating plate 16 formed with a heat generating electroconductive film (hereinafter referred to as "conductive film") 15 is provided on the inner side of the support plate 11. The heat generating plate 16 is made of an insulating transparent plate. The conductive film 15 can be seen through and is formed over the entire area of one surface of the heat generating plate 16, which is further formed with electrodes 17 and 18 in parallel with its upper and lower edges. The conductive film 15 is formed from electroconductive material, such as gold, tin oxide or the like, by vacuum evaporation, and is colored and transparent. The electrodes 17 and 18 are formed by coating the conductive film 15 over the plate 16 with an electroconductive coating composition which is prepared, for example, by admixing an electroconductive powder of gold or like metal with an epoxy resin coating composition. The upper electrode 17 is formed by applying the conductive composition in two parallel lines which are continuous with each other at one end of the plate 16. In the space 19 between the two coating lines, a cut line 21 is formed continuously at the position of a broken line 20 in FIG. 7 to partly remove the conductive film 15. The heat generating plate 16 is affixed at its peripheral portion to the support plate 11 with an adhesive so that the conductive film 15 will be in intimate contact with the support plate 11. The heat generating plate 16 is so sized that it will not obstruct the field of view of the rider 2 wearing the helmet. When bent with the shield panel 6, the support plate 11 comes into intimate contact with the inner surface of the shield panel 6 at the portion thereof corresponding to the heat generating plate 16. A temperature sensor 22 for detecting the temperature of the heat generating plate 16 is mounted on an end portion of the plate 16 at a position approximately midway between the pair of electrodes 17 and 18. A temperature controller 23 in the form of a unit is mounted on one end of the support plate 16. The electrodes 17 and 18 are connected to the power source 27 of the motorcycle 3 via the temperature controller 23, a cable 24, a socket-plug connector 25, a cable 26 and a switch. The connector 25 is provided outside the helmet main body 4 in an exposed state and is readily disconnectable, for example, when the motorcycle 3 falls down to assure safety for the rider 2. The cable 24 is fixed to a portion of the main body in a somewhat free state to permit the opening and closing of the shield panel 6. While the power source of the motorcycle is usable, a separate power source is alternatively usable as the power source 27 as attached to the body of the rider 2.

Figures 7, 8, 10:
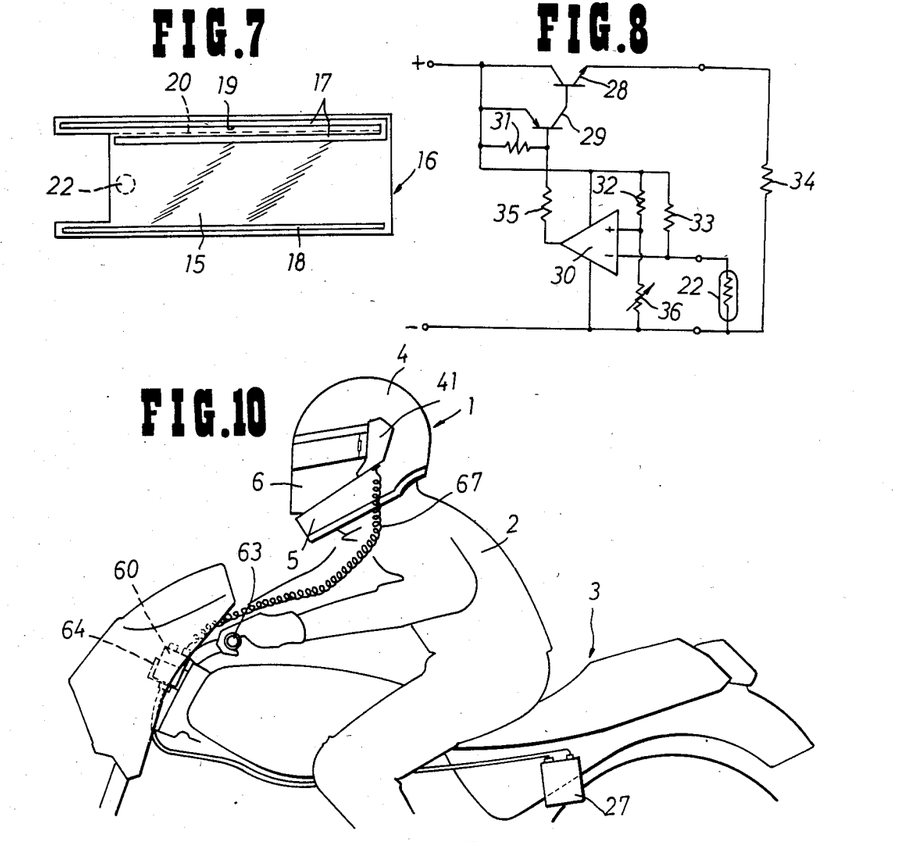
FIG. 7 is a rear view in development showing the heat generating plate.
FIG. 8 is an electric circuit diagram.
FIG. 10 is a side elevation showing the same in use.

As shown in FIG. 8, the temperature controller 23 comprises transistors 28, 29, a comparator 30, resistors 31, 32, 33, 34, 35, a variable resistor 36, etc. and can be in the form of an IC.

When current is passed through the conductive film 15 on the heat generating plate 16, the conductive film 15 releases heat over the entire area thereof to heat the inner surface of the shield panel 6 through the support plate 11, so that when the interior of the helmet main body 4 becomes no longer ventilated upon stopping during running in a cold climate, the inner surface of the shield panel 6 can be prevented from fogging up due to the condensation of water vapor or from icing due to the deposition of water droplets. Since current is passed through the conductive film 15 via the electrodes 17 and 18 which are provided at opposite sides of the film, heat can be generated from the film 15 substantially uniformly over the entire area thereof without resulting in irregularities in temperature. The conductive film 15 can be seen through and therefore will not obstruct the view. Further because the conductive film 15 is colored and transparent, the eyes of the wearer can be protected from ultraviolet rays, infrared rays, etc. by reflection.

When the present device is used on a motorcycle 3 or like vehicle running at a high speed, the shield panel 6 will be cooled with air over its surface, such that unless a great current is passed through the conductive film 15, the amount of heat released is small, with the likelihood that the shield panel 6 will not be heated to a temperature at which freezing can be prevented effectively. However, if the device is set fixedly to a temperature based on the air-cooled state, the shield panel 6 will be heated to an excessively high temperature when the vehicle stops during running. According to the present invention, therefore, the temperature sensor 22 is adapted to detect the temperature of the heat generating plate 16 for the temperature controller 23 to control the current to be passed through the conductive film 15. When the temperature of the heat generating plate 16 varies, with the variable resistor 36 set to a suitable resistivity, the temperature sensor 22 detects the variation in terms of a variation in resistivity and feeds the detected value to the comparator 30, which compares the detected value with the set value. If the temperature of the heat generating plate 16 rises, the comparator 30 gives a decreased output, causing the transistors 28 and 29 to limit the current through the conductive film 15. If the temperature drops, an increased current is passed through the film. Thus the temperature of the heat generating plate 16 is controlled to an approximately constant level to avoid overheating.

The shield panel 6, which generally is an expendable, is replaced by a new one when damaged. In the event of replacement, the support plate 11 having the heat generating plate 16 is removed from the shield panel 6 and then attached to a new shield panel 6 with use of the snap fasteners 12. The heat generating plate 16 and the support plate 11 are used repeatedly. This assures economy since the essentially limited portion only is replaced.

Figure 9:
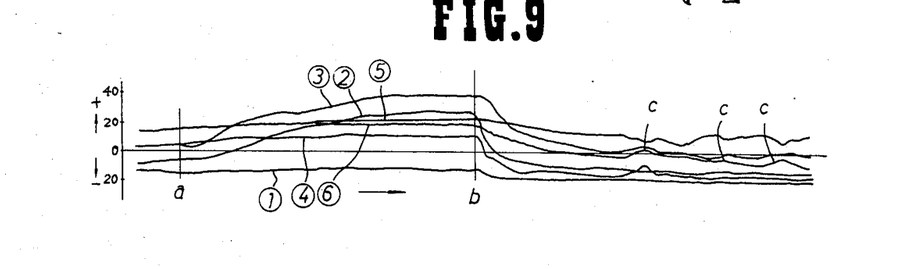
FIG. 9 is a diagram showing an experimental result.

A helmet equipped with the present device was tested in a chamber at −20° C. by forcing air against the helmet at a speed of 80 km/h with a fan. The result is shown in FIG. 9, in which the temperature of the atmosphere is represented by line (1), the temperature of the shield panel 6 by line (2), the temperature of the surface to which the sensor is attached by line (3), the temperature of the end of the support plate 11 by line (4), the temperature of the face skin of the wearer by line (5), the temperature of the interior of the helmet by line (6), the time when the power source switch was turned on by (a), the time when the application of air was started by (b), and variations due to the respiration of the wearer by (c). FIG. 9 reveals that the temperature of the heat generating plate 16 rises beyond the temperature of the interior of the helmet main body 4 immediately after the turning on of the power source and that the inner surface of the shield panel 6 can be prevented from fogging and icing as desired at all times.

Figure 11:
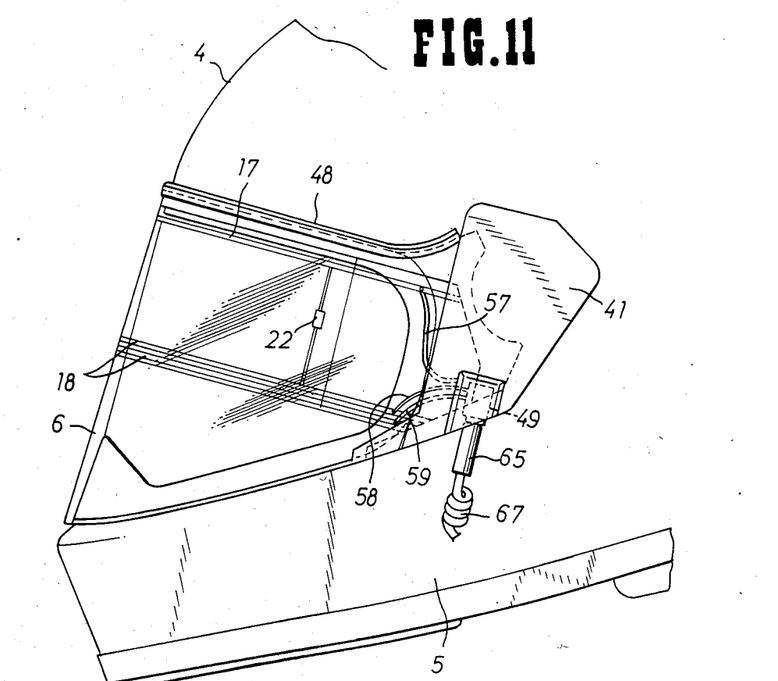
FIG. 11 is a fragmentary side elevation showing a helmet.
Figures 12, 16:
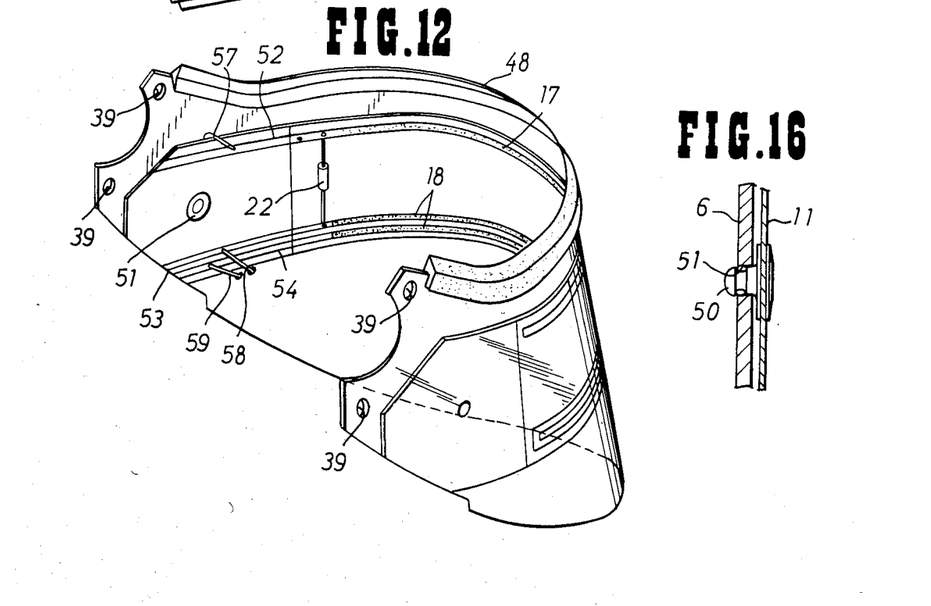
FIG. 12 is a side elevation showing a shield panel.
FIG. 16 is an enlarged view in section taken along the line I—I in FIG. 13.
Figure 13:
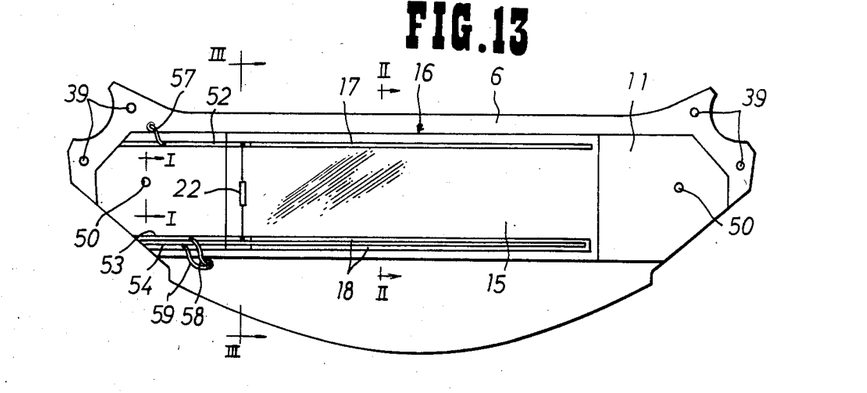
FIG. 13 is a rear view in development showing the shield panel.
Figure 14:
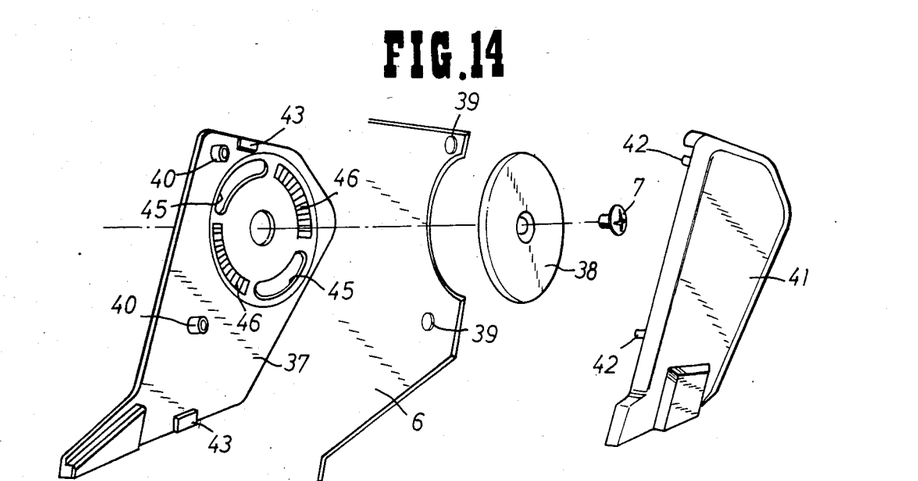
FIG. 14 is an exploded perspective view showing an assembly for installing the shield panel in place.
Figure 15:
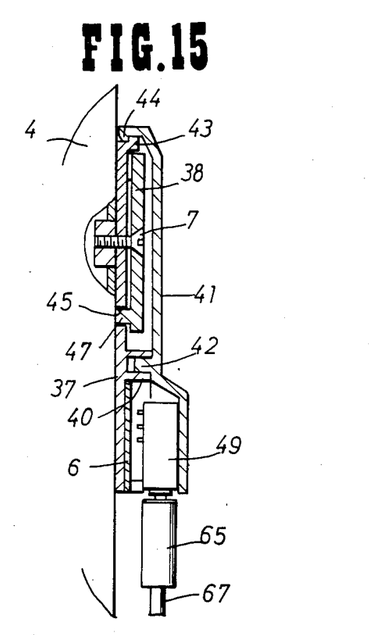
FIG. 15 is a sectional view showing the same assembly.
Figure 17:
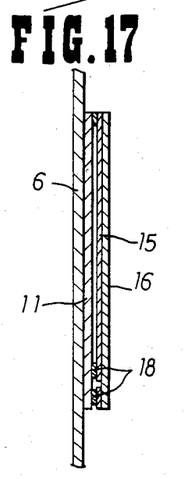
FIG. 17 is an enlarged view in section taken along the line II—II in FIG. 13.
Figure 18:
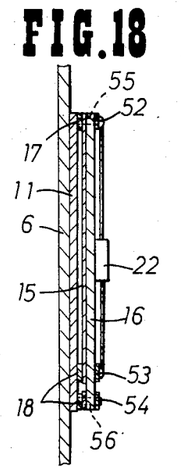
FIG. 18 is an enlarged view in section taken along the line III—III in FIG. 13.

While the helmet 1 described above has the guard 5 pivoted to the main body 4, FIGS. 10 and 11 shows a helmet of different type wherein a guard 5 is fixed to and integral with the main body 4. The present invention is useful also for helmets of this type. In this case, a shield panel 6 is upwardly and downwardly rotatably supported by mount screws 7 with use of bearing plates 37 and positioning plates 38. As shown in FIGS. 12 and 13, the shield panel 6 is in the form of a curved plate and is formed with two holes 39 at each of its opposite ends. As seen in FIG. 14, the bearing plate 37 has boss portions 40 fittable in the holes 39. FIG. 15 shows the shield panel 6 as fixedly held between the bearing plate 37 and a cover 41, which has projections 42 fitting in bores of the boss portions 40 and an engaging pawl 44 in engagement with a stepped portion of the bearing plate 37, whereby the cover 41 is removably attached to the bearing plate 37. The bearing plate 37 is formed with slots 45 and engaging portions 46, while the positioning plate 38 has projections 47 bearing against the helmet main body 4 through the slots 45 and positioning portions (not shown) engageable with the engaging portions 46 and is fixed to the main body 4 by the mount screw 7. Accordingly the shield panel 6 can be retained in a desired opened or closed position by the engagement of the positioning portions with the engaging portions 46. A seal member 48 is attached to the upper edge of the shield panel 6. The cover 41 is provided with a connector socket 49 at a lower inside portion thereof.

As seen in FIG. 16, a support plate 11 inside the shield panel 6 is provided at each of its opposite ends with a projection 50 which is removably fitted in a hole 51 in the shield panel 6. With reference to FIGS. 12, 13, 17 and 18, the support plate 11 is provided at its one end with three striplike foil conductors 52, 53 and 54 corresponding to electrodes 17 and 18 and further extending onto a heat generating plate 16. Of these foil conductors, the conductors 52 and 54 at the upper and lower edges of the plate 11 are electrically connected to the electrodes 17 and 18 on a conductive foil 15 by metal members 55 and 56. A temperature sensor 22 in contact with the heat generating plate is connected between the foil conductors 52 and 53. Lead wires 57, 58, 59 connected to the foil conductors 52, 53, 54 respectively extend outward through holes formed in the shield panel 6 and are connected to terminals on the connector socket 49 in the cover 41.

Figure 19:
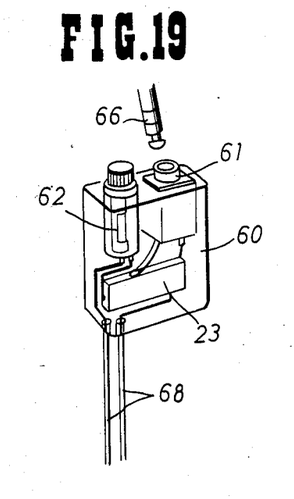
FIG. 19 is a perspective view showing a control box.
Figure 20:
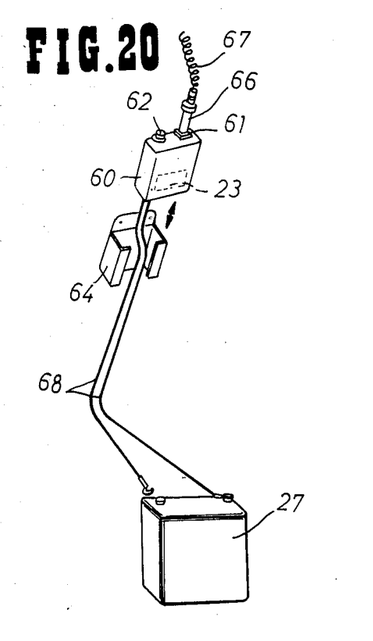
FIG. 20 is a perspective view showing the control box, a mount member and a power source.

As seen in FIGS. 19 and 20, a temperature controller is separated from the helmet main body 4 and accommodated in a control box 60 along with connector socket 61, fuse 62, etc. The control box 60 is removably inserted in a mount member 64 attached to the motorcycle 3 in the vicinity of its handle 63. The control box 60 may be fastened to a suitable portion of the motorcycle 3 as by a band. The connector socket 61 on the control box 60 is connected to the connector socket 49 on the helmet main body 4 by a helical cable 67 having connector plugs 65 and 66 at its opposite ends. The temperature controller 23, the fuse 62, etc. are connected to a power source 27 by cables 68.

With the above arrangement wherein the temperature controller 23 is separated from the helmet main body 4 and installed in the control box 60 on the motorcycle 3, the support plate 11 can be made to have a simplified end portion, while the shield panel 6 is made movable upward or downward with extreme ease free of trouble. The use of the foil conductors 52 to 54 serves to shorten the length of the electrodes 17 and 18 to avoid power loss. In order to assure effective electric connection between the electrodes 17, 18 and the conductive film 15, an electroconductive coating composition is used for the electrodes 17, 18, which therefore invariably involve somewhat increased electric resistance and which result in an increase power loss if longer. When the foil conductors 52 to 54 are used, the electrodes 17, 18 can be of only such a length needed for applying power to the conductive film 16, whereby the power loss can be reduced by a corresponding amount. To prevent the control box 60 from being stolen during parking, the box must be removable from the motorcycle 3.

Figure 21:
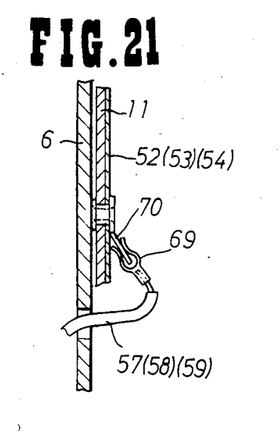
FIG. 21 is a sectional view showing a lead wire connection.

When the shield panel 6 is damaged and is to be replaced by a new one, difficulty will be encountered in replacement if the shield panel 6 has the lead wires 57 to 59 passed therethrough. Accordingly if a terminal member 69 attached to the ends of the lead wires 57 to 59 is connected to a terminal member 70 connected to the foil conductors 52 to 54 as seen in FIG. 21, the support plate 11 is easily removable from the shield panel 6.

Figure 22:
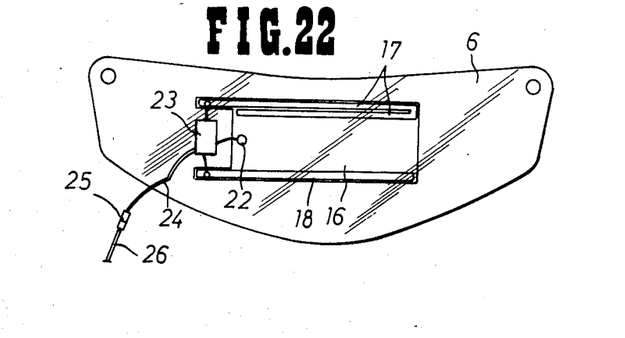
FIG. 22 is a rear view in development showing a shield panel.

The heat generating plate 16, which is attached to the support plate 11 in the foregoing embodiments, may be attached to the shield panel at the level of the eyes of the rider as shown in FIG. 22. Further the conductive film 15 may be formed on the shield panel 6 by vacuum evaporation.

Figure 23:
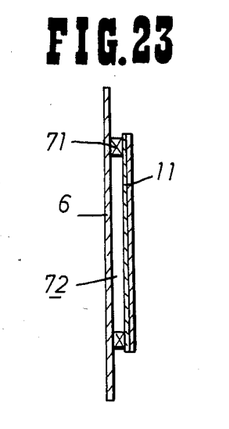
FIGS. 23 and 24 are sectional views showing shield panels.

FIG. 23 shows another modification wherein the support plate 11 is provided with a gasket 71 along its entire peripheral edge, such that when the support plate 11 is attached to the shield panel 6 and bent to the specified form, the gasket 71 bears on the shield panel 6 to form a space 72 between the shield panel 6 and the support plate 11. The space 72 then serves as a heat insulating layer for reducing the power consumption.

Figure 24:
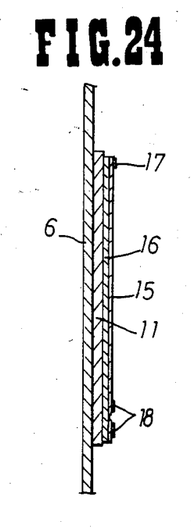

The conductive layer 15 may be formed on one side of the heat generating plate 16 opposite the other side thereof facing the support plate 11 as seen in FIG. 24.

Figure 25:
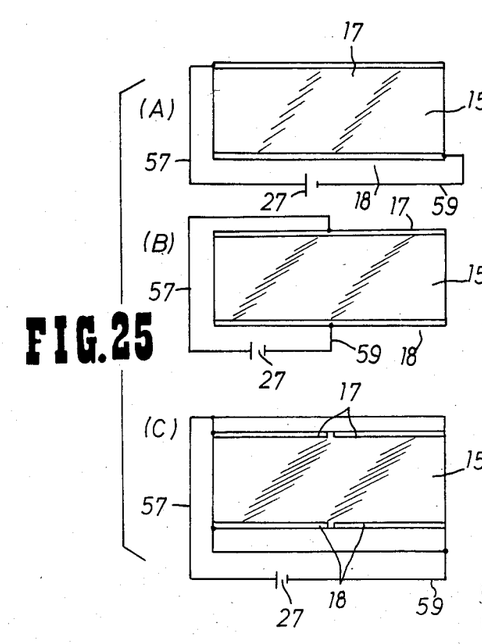

The lead wires 57, 59 may be connected to the electrodes 17, 18 respectively at the electrodes ends which are remote from each other as shown in FIG. 25 (A) or at the midportions of the electrodes 17, 18 as seen in FIG. 25(B). Further alternatively each of the electrodes 17, 18 may be divided into a pair of segments, and each lead wire connected to the ends or midportions of the corresponding segments. The conductive film 15 can be heated uniformly or almost uniformly according to any of these modes of connection.

When the temperature controller 23 is to be mounted on the support plate 11 or on the shield panel 6, it is so positioned that it will not interfere with the helmet main body 4 when the shield panel 6 is opened or closed and that it will not obstruct the view to the greatest possible extent. It is also possible to incorporate both the temperature controller and the power source into the helmet main body 4. The support plate 11 can be installed in place with a planar fastener, screws, or engageable means such as projections or pawls. The shield panel 6, the support plate 11 and the heat generating plate 16 are each made of plastics or like insulating material.

What is claimed is:

1. In a helmet provided with a removable shield panel for closing a front opening in a main body of the helmet, an electrical heating device for preventing the shield panel from fogging, characterized in that a support plate curved along the shield panel is removably attached at its opposite ends to an inner side of the shield panel by fastening means, a heat generating plate being attached to the support plate and formed with a transparent heat generating electrically conductive film by vacuum evaporation substantially over the entire surface of the support plate, a pair of upper and lower electrodes being formed on a surface of the conductive film adjacent to and along upper and lower edges of the film respectively and composed of an electrically conductive coating composition having a conductive metal powder incorporated therein, the pair of upper and lower electrodes extending substantially over the entire length of the film in parallel with each other, one of the pair of electrodes having a first strip portion close to the corresponding edge of the film and a second strip portion close inwardly remote from the corresponding edge, the first and second strip portions being continuous with each other at one end of said one electrode, a cut line being formed in the conductive film and extending lengthwise thereof between the first and second portions to electrically separate the first portion from the second portion except at the continuous portion at said one end, a pair of power supply lead wires being respectively connected to the first portion of said one electrode at another end thereof and to the other electrode an an end thereof which is at the same end of the film as said other end of said one electrode.

2. A device as defined in claim 1 wherein the pair of lead wires are fixed to the support plate at a position outwardly away from the conductive film and longitudinally remote therefrom, and strips of conductive foil are attached to the support plate for electrically connecting the lead wires to the pair of upper and lower electrodes respectively.

3. An electrical heating device as recited in claim 1, wherein the heat generating plate is affixed at a peripheral portion thereof to the support plate and the electroconductive film is in intimate contact with the support plate.

4. An electrical heating device as recited in claim 1, wherein, when curvably bent in conformance with the shield panel of the helmet, said support plate comes in intimate contact with an inner surface of the shield panel at a portion of the support plate corresponding to the heat generating plate.

* * * * *

UNITED STATES PATENT AND TRADEMARK OFFICE
CERTIFICATE OF CORRECTION

PATENT NO. : 4,584,721

DATED : April 29, 1986

INVENTOR(S) : Tamenobu YAMAMOTO

It is certified that error appears in the above-identified patent and that said Letters Patent is hereby corrected as shown below:

Claim 1, line 21, "close" should be deleted;
line 31, "an an" should read --at an--.
Claim 2, line 4, "thereform" should read --therefrom--.

Signed and Sealed this

Thirtieth Day of September 1986

[SEAL]

Attest:

DONALD J. QUIGG

Attesting Officer

Commissioner of Patents and Trademarks